Jan. 27, 1959

R. M. HELLER 2,870,812

NUT AND WASHER ASSEMBLY INCLUDING A RESILIENT
PLASTIC PAD TO PROVIDE A SEAL AND LOCK
Filed Sept. 21, 1953

INVENTOR.
ROBERT M. HELLER
BY Whittemore,
Hulbert & Belknap
ATTORNEYS

United States Patent Office 2,870,812
Patented Jan. 27, 1959

2,870,812

NUT AND WASHER ASSEMBLY, INCLUDING A RESILIENT PLASTIC PAD TO PROVIDE A SEAL AND LOCK

Robert M. Heller, Birmingham, Mich., assignor to Watts Electric & Mfg. Co., Birmingham, Mich., a corporation of Michigan Application September 21, 1953, Serial No. 381,217

1 Claim. (Cl. 151—38)

The present invention relates to a nut and washer assembly.

It is an object of the present invention to provide a nut and washer assembly adapted to serve as means for locking the assembly in operative position, and sealing and insulating a bolt receiving opening against moisture, dirt and the like.

It is a further object of the present invention to provide a nut and washer assembly comprising a nut body having a reduced tubular axial extension at one end thereof, a washer sleeved upon the extension in abutment with the nut body, the axial extension being provided at the free end thereof with an outturned radially extending portion, and a unitary body of resilient material surrounding said axial extension between and in abutting relation with the opposed surfaces of the washer and outturned portion, and enveloping and providing upon the outer side of said outturned portion a compressible pad operable as a sealing element, lock washer and cushioning member when said assembly is bolted against a surface of another element.

It is a further object of the present invention to provide a novel method of making an assembled nut and washer which comprises the steps of providing a nut body with a reduced tubular axial extension, sleeving a washer upon said extension, shaping the free end of said extension to provide an outturned radially extending portion substantially parallel to the adjacent surface of said body, and providing an annular body of yieldable material about said extension between and in abutting relation with the opposed surfaces of said washer and outturned portion, and about and upon the outer side of said outturned portion.

Other objects and features of the invention will become apparent as the description proceeds, especially when taken in conjunction with the accompanying drawings, wherein.

Figure 1:
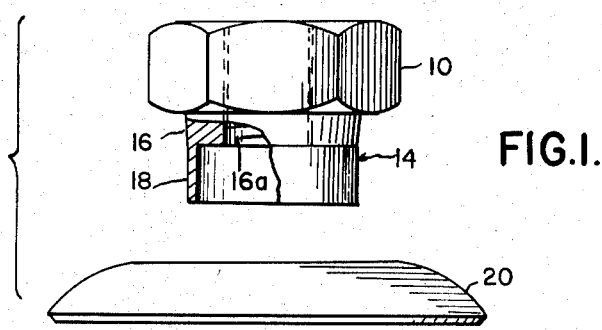
Figure 1 is an exploded view of the nut element and washer prior to assembly.
Figure 2:
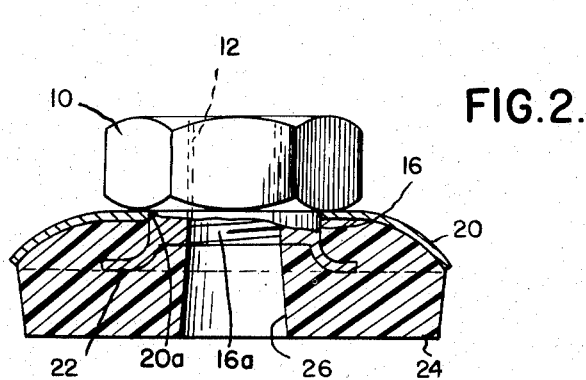
Figure 2 is an elevation of the assembled nut, washer, and resilient body with parts in section.
Figure 3:
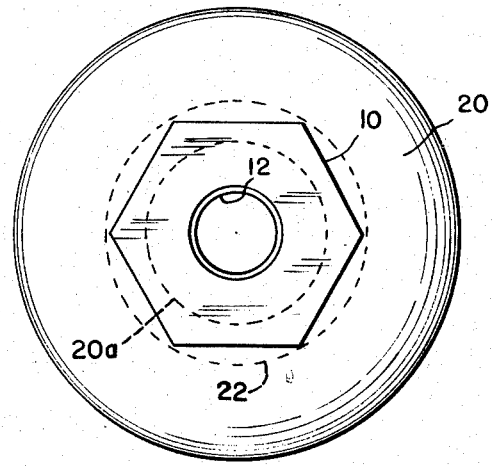
Figure 3 is a plan view of the assembled nut and washer.

The nut and washer assembly is best illustrated in Figure 2 wherein there is illustrated a nut body 10 of conventional type having an internally threaded opening 12 extending therethrough. The nut body 10 may be of suitable polygonal cross-section for cooperation with a wrench or the like. At one side of the nut body 10 in endwise registration with the opening 12 is an integral axially extending tubular extension or projection 14 having an exteriorly tapered relatively thick walled portion 16 and a relatively thin walled cylindrical portion 18 arranged end to end with the portion 18 outermost. Preferably the portion 16 has internal threads 16a connecting into and forming a continuation of the internal threads of the opening 12 for engagement by a bolt (not shown).

In producing the composite article illustrated in Figure 2, the washer 20 is sleeved upon the extension 14 and may if desired be permanently interlocked thereto. Thus for example, the washer 20 may be welded to the nut body 10. Alternatively, the exteriorly tapered portion 16 of the extension 14 may be designed to cooperate with the opening 20a in the washer 20 so as to produce a tight press fit when the washer is assembled.

After the washer 20 has been sleeved upon the tubular extension 14, the portion 18 thereof is shaped to provide at its free end in spaced substantially parallel relation to the adjacent side of the polygonal body 10 an outturned radially extending portion 22. This may be accomplished by a spinning or punching operation. Moreover, the portion 22 may be in the form of separate radial fingers, or it may be in the form of a continuous radially extending annular flange. After formation of the outturned portion 22 at the free end of the extension 14, the resilient sealing body 24 is next applied. Preferably, the body 24 is formed of a suitable thermo setting plastic material such for example as a polyvinyl chloride.

In carrying out the application of the resilient body 24 to the assembly, the threaded opening 12 through the nut body 10 and the internal threads 16a of the portion 16 may be protected by inserting in the threaded opening 12 and the interiorly threaded portion 16 a removable plug or pin which is adapted to extend downwardly below the portion 16 in conformity with the illustrated passage 26 through the body 24. Thereafter, the thermo setting plastic material is applied in liquid form to the washer 20 and portions 16 and 22 of the nut body and is caused to set to assume the shape illustrated in Figure 2.

It will be observed that the complete assembly includes upon the outer side of the outturned portion 22 a substantial quantity or pad of the yieldable or resilient plastic material, and such pad is engageable with the surface of the article to which the nut assembly is applied. As a result, when the nut is tightened against such surface, the pad of resilient material is compressed and serves a plurality of functions. In the first place, it provides a perfect seal surrounding the bolt and bolt hole. In the second place, it serves as a lock washer inasmuch as it will frictionally engage the surface through which the cooperating bolt passes. It will further act as a cushioning element and prevent rattling or vibration of the fastened structure.

It will be observed that the resilient material 24 envelops the outturned portion 22 and is thereby retained in assembled relationship with the nut body 10 and washer 20. However, the plastic material 24 will also adhere to the portions 16 and 22 and to the under surface of the washer 20.

While reference was previously made to the possibility of establishing a mechanical connection between the nut body and washer, it will be appreciated that the resilient body 24 will itself be sufficient to support the washer in the position shown in Figure 2.

The drawings and the foregoing specification constitute a description of the nut and washer assembly in such full, clear, concise and exact terms as to enable any person skilled in the art to practice the invention, the scope of which is indicated by the appended claim.

What I claim as my invention is:

A composite nut and washer assembly comprising a one-piece polygonal body having a bolt receiving opening extending axially thereof and having at one end of and in endwise registration with said axially extending opening an integral axially extending tubular projection, said polygonal body and said tubular projection having connecting internal threads for engagement by a bolt, said tubular projection being provided at its free end in spaced substantially parallel relation to the adjacent side of said polygonal body with an outturned radially extending annular portion, a concavo-convex washer sleeved upon said tubular projection in the space between said polygonal body and said outturned portion, the convex side of said washer bearing against the adjacent side of said polygonal body and disposed substantially parallel to said outturned portion, and a unitary body of resilient material having resilient portions respectively upon opposite sides of said outturned portion, one of said resilient portions surrounding said tubular projection between and adhered to the opposed surfaces of said washer and said outturned portion whereby the washer will be held against displacement from the adjacent side of said polygonal body, and the other of said resilient portions being a yieldable pad underlying said one resilient portion and having a substantially flat bottom extending outwardly substantially as far as the edge of said washer and an axially extending opening in endwise registration with the opening in said tubular projection and adapted to receive the bolt being compressible relative to said tubular projection, outturned portion and washer to serve as a sealing element, lock washer and cushioning member when said assembly is bolted against a surface of another element.

References Cited in the file of this patent

UNITED STATES PATENTS

| | | |
|---|---|---|
| 440,020 | Douillet | Nov. 4, 1890 |
| 1,296,275 | Firth | Mar. 4, 1919 |
| 1,320,259 | Martens | Oct. 28, 1919 |
| 1,393,459 | Smith | Oct. 11, 1921 |
| 1,652,235 | Bronson | Dec. 13, 1927 |
| 1,945,005 | Vacher | Jan. 30, 1934 |
| 2,020,767 | Bullis | Nov. 12, 1935 |
| 2,054,965 | Clo | Sept. 22, 1936 |
| 2,199,647 | Mueller | May 7, 1940 |
| 2,250,050 | Olson | July 22, 1941 |
| 2,257,479 | Olson | Sept. 30, 1941 |
| 2,326,455 | Gray | Aug. 10, 1943 |
| 2,408,366 | Boyer | Oct. 1, 1946 |
| 2,421,105 | Warren | May 27, 1947 |
| 2,681,678 | Hage | June 22, 1954 |
| 2,761,349 | Heller | Sept. 4, 1956 |

FOREIGN PATENTS

| | | |
|---|---|---|
| 104,277 | Great Britain | Mar. 1, 1917 |
| 123,346 | Australia | Jan. 30, 1947 |